United States Patent [19]
Turner et al.

[11] Patent Number: 5,833,541
[45] Date of Patent: Nov. 10, 1998

[54] ELASTOMERIC JOINTS HAVING INTERLOCKING THREADED PORTIONS

[76] Inventors: William E. Turner, 2081 Dennis La., Bethlehem, Pa. 18055; Russell D. Ide, 122 Ridge Dr., Exeter, R.I. 02822

[21] Appl. No.: 732,906

[22] Filed: Oct. 17, 1996

Related U.S. Application Data

[63] Continuation-in-part of Ser. No. 382,051, Feb. 10, 1995, abandoned, which is a continuation-in-part of Ser. No. 96,006, Jul. 23, 1993, Pat. No. 5,447,472.

[51] Int. Cl.⁶ ........................................................ F16D 3/50
[52] U.S. Cl. .............................. 464/20; 175/299; 464/89; 464/147
[58] Field of Search ................................ 464/18, 20, 89, 464/147; 175/299

[56] References Cited

U.S. PATENT DOCUMENTS

| | | |
|---|---|---|
| 2,028,407 | 1/1936 | Moineau . |
| 2,620,165 | 12/1952 | Crickmer ................................. 464/20 |
| 3,099,918 | 8/1963 | Garrett ..................................... 464/89 |
| 3,156,106 | 11/1964 | Crane ....................................... 464/20 |
| 3,263,446 | 8/1966 | Wiggins, Jr. ............................. 464/20 |
| 3,301,009 | 1/1967 | Coulter, Jr. .............................. 464/20 |
| 3,323,326 | 6/1967 | Vertson ................................... 464/20 |
| 3,627,453 | 12/1971 | Clark . |
| 4,080,115 | 3/1978 | Sims et al. . |
| 4,246,765 | 1/1981 | Zabcik ..................................... 464/20 |
| 4,276,947 | 7/1981 | Hebel ...................................... 464/20 |
| 4,913,411 | 4/1990 | Collins et al. . |
| 5,007,490 | 4/1991 | Ide . |
| 5,007,491 | 4/1991 | Ide . |
| 5,135,060 | 8/1992 | Ide . |
| 5,447,472 | 9/1995 | Ide ........................................... 464/20 |

*Primary Examiner*—Eileen A. Dunn

[57] ABSTRACT

An elastomeric joint that can be used, as part of an articulated coupling in a progressive cavity device, including using the articulated coupling for converting the complex motion of the rotor into simple rotation. The coupling includes two shafts coupled to one another by coupling assemblies connected to opposite ends of an intermediate shaft. The coupling assemblies include interlocked threaded and tapered portions and an elastomer filling the spaces between the threaded portions. Under loading the male and female portion move relative to one another so that the elastomer is subject to both compression and shear. Should the elastomer fail, the threaded portions simply lock together thereby allowing fail safe operation. Provisions are also made to protect the integrity of the coupling under reverse torque. The moving components within the coupling are perfectly isolated from the surrounding environment. The coupling and coupling can also be used for other applications, especially those involving high torque loads and those requiring suppression of vibrations and shocks.

16 Claims, 11 Drawing Sheets

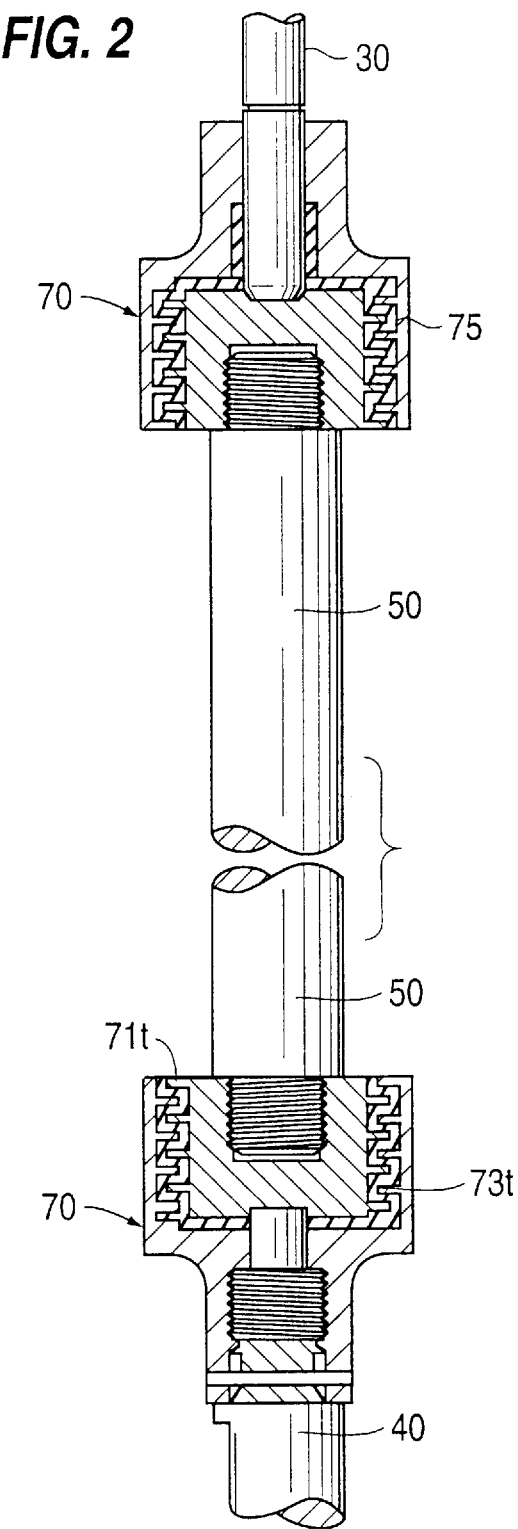

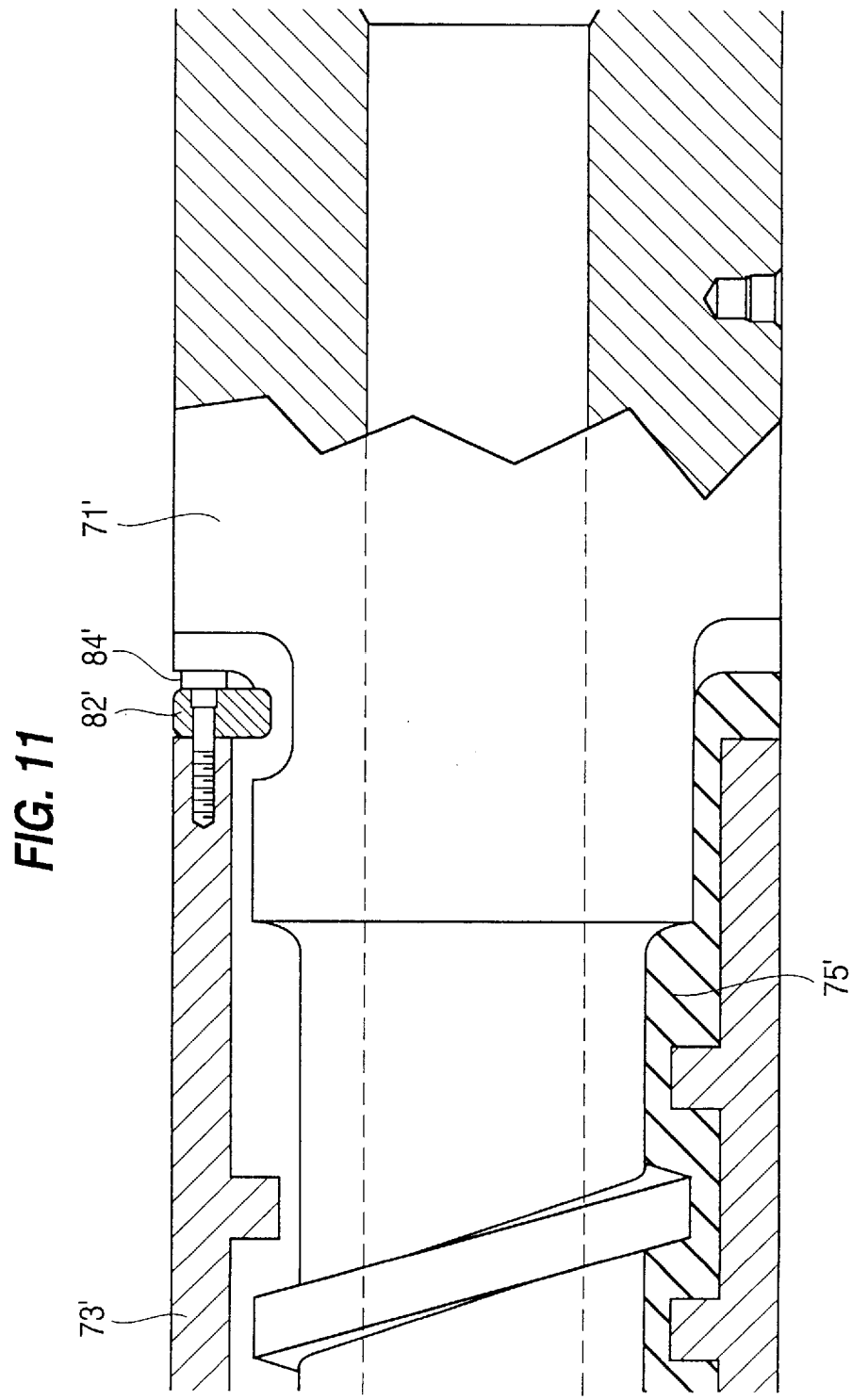

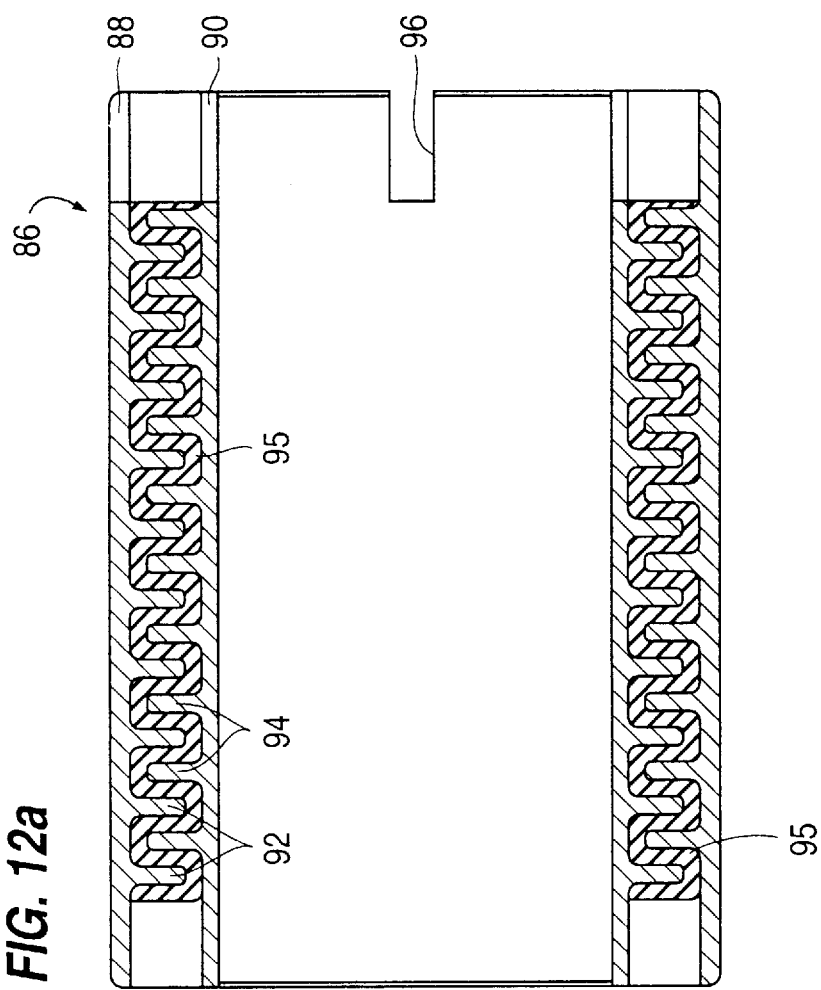
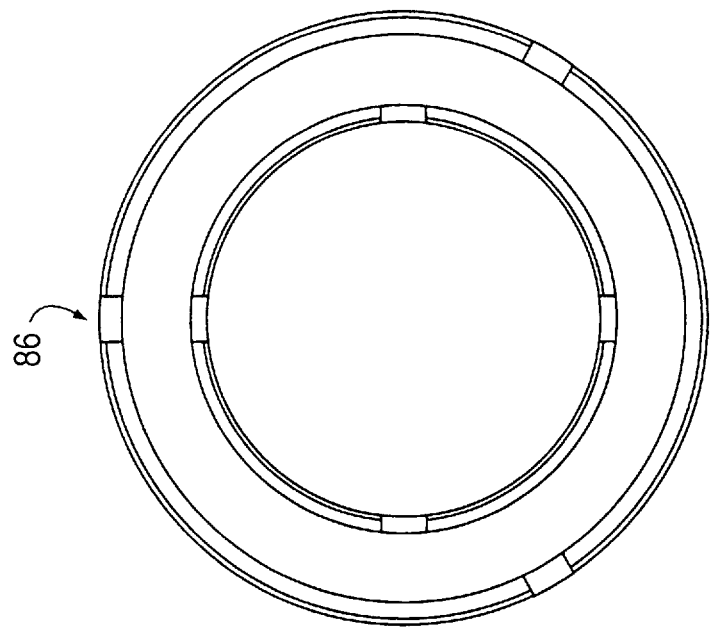
FIG. 12a
FIG. 12b

ELASTOMERIC JOINTS HAVING INTERLOCKING THREADED PORTIONS

Application is a continuation-in-part of U.S. Ser. No. 08/382,051 now abandoned, which was filed Feb. 10, 1995, which is a continuation-in-part of U.S. Ser. No. 08/096,006, which was filed Jul. 23, 1993 and which issued as U.S. Pat. No. 5,447,472 on Sep. 5, 1995.

BACKGROUND OF THE INVENTION

1. Field Of The Invention

The present invention generally relates to an elastomeric joint, especially a joint between male and female members having substantially interlocking threads or ribs and an elastomeric material disposed therebetween. In particular, the present invention relates to elastomeric joint that can tolerate high-level combined loading (such as combined torsional, axial, and lateral loads). In addition, the present invention relates to an elastomeric joint of this type that can also be flexible, so that it can deflect or articulate. Finally, the present invention relates to an elastomeric joint that can suppress shocks and vibration so as to prevent fatigue-related deterioration and the like. Such elastomeric joints include both torque transmitting couplings and independent equipment package suspensions.

2. Description of Related Art

Torque-bearing joints and couplings are generally known in the art.

For example, a known well-drilling arrangement uses a rotary well drilling string that is connected to a drill bit. The drilling string comprises a plurality of interconnected segments (usually pipe segments) with a drill bit on the end thereof. The interconnected segments are rotated to drive the drill bit. However, as the drill bit is operated, (to drill rock, for example), vibrations, usually at high frequencies, occur and are transmitted along the drilling string. These high frequency vibrations tend to cause fatigue, deterioration, and finally failure of the elements of the drilling string.

It is therefore desirable to provide a shock absorber in the drilling string that will suppress vibrations from the drill bit. One example of such a shock absorber is disclosed in U.S. Pat. No. 3,323,326 to Vertson.

Vertson generally discloses a shock absorber in which an inner part is inserted into an outer part. The inner and outer parts are both threaded in corresponding manner to permit interengagment with each other. A portion of the inner part has an internally threaded box, while a lower portion of the outer part has an externally threaded pin. In use, the pin and box are used to threadedly incorporate the shock absorber in a drilling string.

Vertson's shock absorber also includes interengaged splines at corresponding locations on the inner and outer parts. Vertson discloses that the splines are provided to, in part, transmit torsional and axial loads. The splines are welded into position, according to Vertson.

Finally, a deformable rubber material is filled in spaces between the aforementioned splines and between the threads by which the inner and outer parts are engaged.

It will be appreciated, however, that structurally critical (i.e., weak) areas exist at the thin-walled section of the outer portion that is not supported internally by the pin, and at the section of the pin that is likewise not supported by the box.

In addition, the provision of welded-on splines makes Vertson's shock absorber complicated to manufacture.

In yet another example, shock absorbing devices are used as a suspension to isolate sensitive components attached to a structure, such as a drilling string, that is subject to shock and vibration damage.

In another example, such torque-bearing couplings are useful in progressive cavity devices configured as pumps and driving motors. These progressive cavity devices typically have a helically-shaped single shaft disposed within a cavity defined by a flexible lining within a housing. The generating axis of the helix is the true center of the shaft. Typically, the lined cavity is in the shape of a helix having at least two rotations or cycles (one more than the shaft disposed therein) with twice the pitch length of the helical shaft. Either the shaft or the housing is secured to prevent rotation, and the unsecured part rolls relative to the secured part. As used herein, "rolling" means the normal motion of the unsecured part of progressive cavity devices. In so rolling, the shaft and housing cooperate to define a series of sealed cavities which are 180 degrees apart. Furthermore, as one cavity increases in volume, its counterpart cavity decreases in volume at exactly the same rate. The sum of the two volumes is constant, therefore.

Examples of progressive cavity motor and pump devices are well-known in the art. The construction and operation of such devices may be seen in, for example, U.S. Pat. Nos. 3,627,453 to Clark (1971); 2,028,407 to Moineau (1936); 1,892,217 to Moineau (1932) and 4,080,115 to Simms et al. (1978). When used as a pump, the unsecured part is caused to roll by a rotating driving shaft coupled to the unsecured part by an articulated coupling. This causes the sealed cavities to move axially in a way that can be used to forcefully pump fluids. Progressive cavity, or Moyno, pumps are used in a variety of applications. In the past, however, such pumps have not been successfully used downhole because of the difficulty in finding a suitable articulated coupling. Also, most conventional downhole pumping is done with centrifugal pumps, not downhole pumps. There are, however, applications where a progressive cavity pump might be used downhole to pump oil, especially heavy crude oil which is very viscous. The coupling of the present invention is well-suited for such applications.

On the other hand, when used as a motor for downhole drilling, a high pressure fluid is forced into the progressive cavity device past the unsecured part of rotor in order to produce a rotor driving motion. The driving motion of the rotor is quite dynamically complex in that it is simultaneously rotating and moving transversely relative to the stator. One complete rotation of the rotor corresponds to a transverse movement of the rotor from one side of the stator to the other side and back. The true center of the rotor will, of course, rotate with the rotor. However, in a typical construction, the rotation of the true center of the rotor traces a circle progressing in a direction opposite to the rotation of the rotor, but with the same speed (i.e., a reverse orbit). One complete rotation of the rotor, therefore, results in one complete rotation of the true center of the rotor in the opposite direction. Thus, the rotor driving motion is simultaneously a rotation, an oscillation, and a reverse orbit. For multi-lobe motors the reverse orbit is a multiple of the rotational speed, e.g., if a three lobe motor is used, then the reverse orbital speed is three times as great as the rotational speed.

Progressive cavity motors are commonly used in directional drilling. Among the most common directional drilling techniques is the use of downhole drilling motors in combination with a bent sub. The bent sub is a section of drill pipe manufactured with a slight angle that is installed in the drill string above the bit. The built-in angle of the sub exerts a side force on the bit and causes it to be deflected from the previous direction of the hole. Bent subs typically provide deflections ranging from near zero to about 5°. Thus, the drill shaft must be capable of bending or articulating so that the downhole motor can pass the bend in the drill pipe. Typically, either turbine-type or progressive cavity downhole motors are used. However, it is also possible to use an electric motor in some cases.

The use of conventional progressive cavity devices as pumps or motors downhole causes certain additional problems, however. For example, despite the relatively simple construction of progressive cavity devices, extreme environmental conditions present downhole still cause problems in operation. These problems are primarily related to the inability of the drive train to handle the complex rotor driving motion (described above) in a durable, reliable, and inexpensive manner. Couplings that connect the rotor of a progressive cavity pump or motor with the pump driving shaft or drill driving shaft must be able to operate in a contaminated, hostile environment. Moreover, the couplings must operate while handling very high torque loads and transmitting the rotational output of the rotor without the orbital motion of the rotor (in the case of motors) and converting simple rotation into orbiting of the rotor (in the case of pumps). If the couplings fail, equipment can be lost downhole.

Of the couplings used in progressive cavity devices, the most commercially successful has been a universal coupling attached to the driving end of the rotor and connected to a universal coupling attached to the driven drill shaft. As is known, such U-couplings (also called Hooke's joints) react or resolve the orbital motion by the sliding of pin members in a universal assembly. Thus, such couplings typically include elements which slide relative to one another.

The principle on which the Hooke's type of universal assembly works is illustrated in FIG. 3. The shaft A has a fork or yoke at its end. Pivoted between the prongs of this fork is a cross-piece C. The cross-piece C can therefore pivot about the axis XX relative to the shaft A. The other shaft B similarly includes a fork or yoke at its end and the other arms of the cross-piece C are pivoted between the prongs of this fork. The shaft B can therefore pivot about the axis YY relative to the cross-piece C. Since the cross-piece C can pivot about the axis XX relative to the shaft A, the shaft B can assume any angular position in three-dimensional space relative to shaft A. It follows that if the shafts A and B are supported in bearings with their axes at an angle to one another, then when the shaft A is turned about its axis, this motion is communicated to the shaft B and shaft B, in turn, turns about its axis; the arms of the cross meanwhile oscillating in the prongs of the forks.

The axes XX and YY intersect at O and are perpendicular to one another. The axes of the arms of the cross-piece C are also perpendicular to their respective shafts. The axes of the shaft A and B also intersect at O, which point is commonly referred to as the "center"of the coupling.

Although FIG. 3 shows a specific pivoting connection by way of example, it does not matter in the instant discussion how the pivoting action is obtained. All that is required is that the shaft B be able to pivot independently about two intersecting and perpendicular axes such as XX and YY, relative to shaft A. There are many known constructions for achieving this result.

A single Hooke's joint, as described above, suffers from a disadvantage that is obviated in some other examples of couplings. Specifically, when two shafts are connected by a single Hooke's joint, and one of the shafts rotates at an absolutely constant speed, then the other shaft does not rotate at a constant speed but at a speed that is, during two parts of each rotation, slightly greater than, and, during the other two parts of the rotation, slightly less than the constant speed of the first shaft, i.e., the velocity varies cyclically. The magnitude of this fluctuation in speed depends on the angle between the axes of the two shafts, being zero when the deflection is 0°, but becoming considerable when the deflection angle is large. This disadvantage is of practical importance in applications such as downhole drilling, where it is important to maintain a constant or substantially constant speed of rotation. This disadvantage can be obviated by using two Hooke's joints and an intermediate shaft therebetween, the intermediate shaft being arranged so that it makes equal angles between the first and second stub shafts and the pivot axes of the intermediate shaft being arranged parallel to each other. The irregularity introduced by one joint is then canceled out by the equal and opposite irregularity introduced by the second joint.

While the coupling of the present invention is particularly well suited to a submersible pump used downhole, this use has not yet been pursued. Thus, it is believed that the difficulties experienced with couplings downhole can best be appreciated by the example reference to downhole motors which are, of course, well known.

Attempts to apply universal couplings to downhole motors have suffered from several disadvantages, particularly in the area of reliability. The primary reason for this is that the fluids used in a progressive cavity drilling apparatus often are or quickly become abrasive. This abrasive fluid flows between the relatively moving (sliding) surfaces of the U-coupling, thereby causing rapid wear.

In the past, there have been attempts to isolate the sliding pivot surfaces of a universal coupling from contaminants and/or heavy vibrations. Examples of such constructions are shown in U.S. Pat. No. 2,727,370 to Holland; U.S. Pat. No. 3,262,284 to Maxwell-Holroyd; U.S. Pat. No. 4,861,314 to Mazziotti. However, in such known cases there is always sliding between the seal and one of the surfaces of the U-coupling components. As a result of this sliding, the seal is not truly complete and the U-coupling components therefore are not completely isolated. Thus, the possibility of contamination still remains exists, particularly in a high pressure application such as downhole drilling.

Another type of universal coupling assembly for use in downhole motor drives is disclosed in U.S. Pat. No. 4,772,246 to Wenzel. This patent discloses a pressure equalization arrangement which significantly reduces the pressure differential across the seal. As a result, the likelihood of leakage of drilling mud into the universal coupling is reduced. Despite the advantages it offers, however, this construction is complicated and expensive. Further, the U-coupling components are not completely isolated because the seal is not hermetic. Consequently, there is still some possibility of contamination of the U-coupling assembly. Thus, while the need to seal the components of a U-coupling at least to some degree has been recognized, the need to perfectly or completely isolate these components and a reliable means of doing so are not known in the prior art.

These problems are addressed in U.S. Pat. No. 5,007,490 entitled "Progressive Cavity Drive Train with Elastomeric Joint Assembly for Use in Downhole Drilling,"U.S. Pat. No. 5,007,491 entitled "Downhole Drilling Apparatus Progressive Cavity Drive Train with Sealed Coupling,"and U.S. Pat. No. 5,048,622 entitled "Hermetically Sealed Progressive Cavity Drive Train for Use in Downhole Drilling." The aforementioned U.S. Pat. No. 5,007,490 discloses, among other things, a coupling assembly in which load is transmitted through an elastomer.

While a well-sealed double universal coupling is suitable for use downhole, it is not necessarily most preferable. There are very specific requirements for a coupling used downhole. An ideal coupling meets these requirements without sacrificing durability. In particular, the coupling does not have to be particularly flexible. In normal use, the coupling typically undergoes only 3° to 4° deflection and thus, need not deflect more than about 5°. Thus, the extreme flexibility offered by universal couplings is not actually necessary. In some cases, a relatively thin and flexible shaft can bend the necessary 5° without an additional coupling. However, other factors are important as well.

Suitable couplings used downhole must transmit enormous thrust and torque forces. For example, in a medium-sized mud motor, the shaft must reliably transmit a thrust load of 20,000 lb. and a torque of 60,000 inch-pounds. In submersible pumps, extremely viscous fluids such as heavy crude oil are particularly difficult to pump. Conventional couplings are not capable of accommodating such loads for sustained periods.

U.S. Pat. No. 5,135,060 addresses these problems by providing an articulated coupling which includes two distinct sections. The first is a torque-transmitting section for transmitting the necessary torque but not a thrust load. The second section is a thrust transmitting section for transmitting the necessary thrust load but not any torque. The thrust-transmitting section and the torque-transmitting section are both capable of bending as necessary to accommodate directional drilling.

A final consideration in the selection of elastomeric joints generally is the need for a coupling which is fail-safe. Since the coupling is used deep beneath the earth's surface, for example, coupling failure can be extraordinarily expensive, if not catastrophic. At a minimum, it is desirable that the elastomeric joint maintain the connection between components even when excessive torque loads are transmitted. It is also desirable to provide fail-safe coupling integrity under reverse torque.

Thus, a coupling is still needed that is substantially fail-safe, can transmit high torque and suppress vibration, and still has a diameter small enough to be inserted down the well casing.

Summary of the invention

The present invention therefore provides an improved elastomeric joint having an improved ability to reliable transmit combined loading, especially high torque loads as are commonly associated with well drilling applications. The elastomeric joint according to the present invention can also suppress the transmission of vibrations and shocks and is relatively simple to manufacture.

In a first aspect of the present invention, a general elastomeric joint is provided that has an improved ability to transmit high torque loads reliably. The elastomeric joint includes longitudinally arranged male and female threaded portions or sections. The male and female portions are threaded together to interlock with one another, but are dimensioned such that a tortuous helical space remains between the interlocked portions. The helical space between the male and female is entirely filled with an elastomer that is bonded to the male and female threaded portions.

In a particularly preferred embodiment of the present invention, the male and female portions are each tapered in corresponding fashion. It has been found that tapering the male and female portions in corresponding manner optimizes the strength of critical sections of the male and female sections, respectively. Also, with tapered male and female sections, the elastomer is forced into a narrowing area under torque loading. Since the elastomer is virtually incompressible, the torsional stiffness of the joint is thereby increased and there is no need for splines or the like to transmit torque loads as in the known art.

In addition, because of the elastomer connection between the longitudinally arranged coupling portions, the coupling portions may be pivoted with respect to one another in all directions to a limited, but sufficient, degree. Consequently, the coupling may be made flexible. Since torsional loads are transmitted by shear through the entire helical length, torsional load capacity is further enhanced. Thus, an important aspect of the present invention is provision of an elastomeric joint assembly with improved torque-bearing capability that does not need to include interengaged splines or the like to bear torque loads, as in the prior art.

Further, because the relatively moving surfaces are completely isolated from the surrounding environment by virtue of the elastomer, abrasives cannot enter between the relatively moving surfaces of the respective male and female joining portions. Moreover, the structure is fail-safe since the male and female portions will simply thread together under operational torque loading in the event of completed or partial failure of the elastomer.

However, the present invention also provided fail-safe protection from failure under reverse (i.e., loosening) torque, by providing, for example, locking pins or a locking plate that prevent the male and female portions from disengaging from each other.

The elastomeric joint according to the present invention may be used in, for example, a shock absorbing device in a well drilling string. As mentioned above, a well drilling string generally includes a plurality of segments that are coupled together, with a drill bit provided on an end of the plurality of coupled segments. Generally, a shock absorbing device according to the present invention is provided between the drill bit and the segments of the well drilling string. A shock absorbing device according to the present invention may also be used to isolate sensitive components, such as instrumentation packages, which can be attached to the well drilling string, but which are susceptible to shock and vibration damage from vibrations in the well drilling string that arise during the drilling process.

In addition, it is sometimes necessary and/or desirable to electrically, magnetically, and or acoustically isolate sections of the well drilling string from other sections adjacent thereto. The elastomeric device described herein provides such isolation capability while still retaining the ability to transmit drilling loads in the well drilling string.

The tapered structure in the shock absorber can relieve the problem of structural weakness at the aforementioned critical sections of the joint. Moreover, there are cases where a drilling string also has a low tolerance for bending stresses because, for example, the string contains sensitive instruments or the like. Therefore, the present invention also relates to reducing bending stresses on the aforementioned critical sections by adjusting, usually increasing, the thickness of the elastomer provided at the critical sections.

The elastomeric joint of the present invention may also be used as, for example, a coupling in a progressive cavity apparatus, either as a motor or as a pump. When used as a motor, the progressive cavity device is connected to the lower end of the drill string and includes a stator, a rotor within the stator, and means for flowing fluids through the stator to drive the rotor. When used as a pump, the device includes a means such as an electric motor or rotating drive shaft for causing the rotor to roll within the stator.

The coupling has a first stub shaft, a second stub shaft and intermediate shaft and a pair of the elastomeric joint assemblies of this invention. The intermediate shaft is coupled, via the coupling assembly, to the first stub shaft at one end and the second stub shaft at the other end. The connection of the shafts via the elastomeric joint assemblies is such that the coupling functions collectively somewhat like a double Hooke's joint.

When used in a drill motor, the drill bit has a tubular housing connected to the second end of the second stub shaft for rotation with the second stub shaft. The coupling converts the complex rotor motion into rotational drilling motion about an axis displaced from and parallel to said rotor axis.

When used as a pump, the rotation of one end of the coupling leads to rolling of the other end within the cavity. Typically, the other end is the rotor or unsecured portion of the progressive cavity apparatus. Consequently, rotation of one end of the coupling, such as by an electric motor, results in an axial progression of sealed cavities which can be used to pump liquids, even a viscous liquid such as heavy crude oil.

The present invention obviates the problems associated with known progressive cavity devices by providing a progressive cavity drive train including a progressive cavity device and a hermetically sealed coupling which converts the complex motion of the rotor into simple rotation of the drill shaft or vice versa, in the case of pumps. The drive train is inexpensive, reliable and durable in comparison to known progressive cavity drive trains.

The progressive cavity drive train includes a housing structure, a stator having a longitudinal axis, a rotor having a true center and being located within the stator, first and second stub shafts and an intermediate shaft coupling the stub shafts through sealed elastomeric helical coupling assemblies in a universal type fashion.

The stator and the rotor have coacting helical lobes in contact with one another at any transverse section. The stator has one more helical lobe than the rotor such that a plurality of cavities are defined between the rotor and the stator. The rotor is adapted to rotate within the stator such that the true center of the rotor orbits the axis of the stator; the orbit has a predetermined radius. The orbit is constant, such that the rotor motion can be precisely controlled. The orbit of the rotor causes progression of the cavities in the direction of the axis of the stator.

The first stub shaft has a longitudinal axis and first and second longitudinal ends. The first end of the first stub shaft is connected to and movable with the rotor. The second end of the first stub shaft is formed into a portion or directly connected to a portion of an elastomeric joint assembly.

The second stub shaft has a longitudinal axis which is substantially collinear with the axis of the stator and first and second longitudinal ends. The second stub shaft is supported in the housing so that its longitudinal axis is fixed and the second stub shaft is rotatable about its longitudinal axis. The second end of the second stub shaft is formed into a portion of or directly connected to a portion of an elastomeric joint assembly.

The intermediate shaft member is formed into or directly connected to a portion of a coupling assembly at each end thereof. In this way, the intermediate shaft is coupled, through the elastomeric helical coupling assemblies, to the first stub shaft at one end and the second stub shaft at the other end such that the first, intermediate and second shafts are pivotally connected to one another via the coupling assemblies in a manner similar to that of a double Hooke's joint.

By virtue of this construction, the first stub shaft can rotate about its axis and orbit about the axis of the second stub shaft at the same time the second stub shaft rotates about its longitudinal axis. In this way, the complex rotor motion is resolved into simple rotation for driving the drill assembly of a downhole drill or, in the case of a pump, simple rotation can be used to cause the rotor to roll within the stator.

As described above, the drive train of the present invention includes a progressive cavity device and a sealed coupling. The progressive cavity device includes the stator, the cavity within the stator, the rotor within the stator cavity, and a passageway through which fluid or fluids may flow. The sealed coupling includes the offset stub shafts, the intermediate shaft, and the coupling assemblies coupling the stub shafts.

In operation as a motor, flow of fluids through the stator cavity produces the complex rotor driving motion. The sealed coupling is secured to the end of the rotor projecting from the fluid discharge end of the stator. The coupling converts, or resolves, the rolling of the rotor into a rotational motion substantially about a single axis at the same or similar speed.

When used as a pump, rotation of the driving shaft is transmitted through the coupling to the rotor, causing the rotor to roll. The orbiting of the rotor causes a progression of cavities which can be used for pumping in the manner of a conventional Moyno pump.

It has been found that couplings, when used downhole, are most reliable when the sliding components of the coupling are isolated from the surrounding environment. Further, the present inventors have discovered that, despite the relative movement between coupling components, it is possible to completely isolate or hermetically seal the relatively moving surfaces in a coupling used in a progressive cavity downhole drilling drive train. In part, the present invention results from recognizing that universal couplings can be designed to resolve the complex motion of a downhole progressive cavity drive train, without large angular deviations between adjacent shafts in the universal assembly. In fact, by making the coupling sufficiently long, the rotor motion can be resolved by a coupling without skewing the shaft portions more than about 5°. This means that, in a coupling for a downhole drilling or pumping assembly, the amount of movement between the relatively movable male and female portions is normally less than about 0.05 inches. It follows that couplings specifically designed for use in downhole progressive cavity devices do not need to have the flexibility typically required of universal type coupling. Recognizing this has enabled design of a coupling with limited, but sufficient, flexibility and completely isolated sliding components. The design of the present invention also has exceptionally high torque transmitting characteristics.

Thus, the present invention also relates to a progressive cavity drive train in which the complex rotor motion is resolved by a coupling (preferably having elastomeric joint assemblies of the present invention at each end of the coupling) which is modified such that the moving surfaces within the coupling assembly are perfectly isolated.

Moreover, the coupling assemblies have a fail safe construction under operational and reverse torque loading.

BRIEF DESCRIPTION OF THE DRAWINGS

Other objects, features, and advantages of the present invention are hereinafter set forth and explained with reference to the drawings, wherein:

FIG. 2 is a side view, partially in section, of the coupling of the present invention.

FIGS. 10b and 10c are side and plan views, respectively, of a locking plug used in conjunction with the first example of a fail-safe mechanism against reverse torque illustrated in FIG. 10a.

FIG. 11 is a enlarged side sectional view of an elastomeric joint assembly illustrating a second example of a fail-safe mechanism against reverse torque.

FIGS. 12a and 12b are side sectional and end views, respectively, of a component suspension according to the present invention.

DETAILED DESCRIPTION OF THE PREFERRED EMBODIMENTS

The present invention generally contemplates an improved elastomeric joint or coupling, as well as a drive train having a more reliable high torque coupling. The joint or coupling disclosed hereinafter is generally applicable to applications in which only limited flexibility is required, but in which performance demands (e.g., torque capacity and vibration tolerance) and operating conditions are extremely demanding. The most obvious example is downhole drilling and pumping using progressive cavity devices. With that understanding, the present invention will be described primarily in the context of downhole drilling. The invention is also particularly well-suited for use in a downhole progressive cavity pump or applications with similar demands, such as shock absorption in a drilling string. It is also useful for isolating sensitive components electrically, magnetically, and/or acoustically, and for isolating sensitive components from shock and vibration damage. The use of progressive cavity pumps is well known and the application of the coupling of the present invention to a progressive cavity pump should be readily understood in view of the following description. It is expected, naturally, that there are other applications for the coupling of the present invention.

Figure 1:
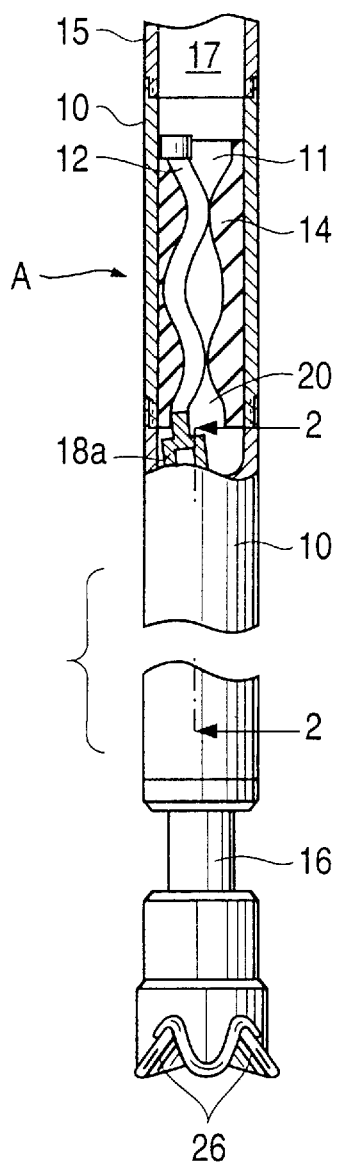
FIG. 1 is an elevation view partly in section of the overall structure of a downhole drilling apparatus of the type in which the coupling of the present invention may be used.
Figure 3:
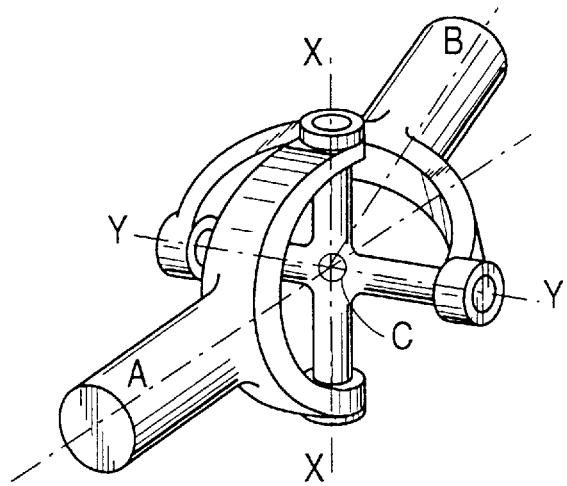
FIG. 3 is a perspective view of a conventional universal coupling assembly.

FIG. 1 shows one possible application of the coupling of the present invention, used in a progressive cavity drilling apparatus using a progressive cavity drive train. This general structure is familiar to those skilled in the art. The apparatus includes a drill string 15, a progressive cavity drive train, a drill bit drive shaft 16 and a drill bit 26. The drive train of the present invention comprises a progressive cavity device and a sealed coupling for converting the motion of the rotor of the progressive cavity device, i.e., orbiting of the rotor and the rotational motion of the rotor, into rotation about a single axis at the same speed.

As illustrated in FIG. 1, the progressive cavity device A has a stator, a rotor, a passageway 11 for fluid to enter between the stator and the rotor, and a passageway or outlet 20 for the fluid to exit therefrom. In the drawings, the housing 10 and its flexible lining 14 are held against movement so that they function as the stator in the device A and the shaft 12 functions as the rotor. The housing 10 is tubular and its interior communicates with inlet 11 in the top portion of the lining 14 to provide a passageway for fluid to enter the progressive cavity device A. Outlet 20 in the bottom portion of the lining 14 serves as the passageway for fluid to discharge from the progressive cavity device A. The shaft 12 is precisely controlled so as to roll within the lining 14. The progressive cavity device A is attached to the lower end of a drill string 15.

The lower end of the rotor shaft 12 includes a shaft connection 18a. The shaft connection also allows the rotor 12 to be directed to a stub shaft of the coupling (described below). The coupling is located in the lower part of the housing 10 and is not visible in FIG. 1. As noted above, one end of the coupling is directly connected, by threading, splining or the like, to the rotor shaft 12. The other end of the coupling is similarly connected to a drill bit drive shaft 16. Typically, the coupling includes separate stub shafts which are connected to the rotor shaft 12 and drive shaft 16 by connecting means such as threads, splines and the like. Of course, a stub shaft could be integrally formed (connected) to either of these shafts, if desired. The drill bit drive shaft 16 is rotatably connected to a conventional drill bit 26.

The progressive cavity device of the present invention may function as a fluid motor or driving apparatus for driving the drilling apparatus shown in FIG. 1. If so, a pressurized fluid, typically water carrying suspended particles commonly referred to as "mud,"is forced into the progressive cavity device. The rotor 12 responds to the flowing fluid to produce a rotor driving motion which is simultaneously a rotation, an oscillation, and an orbit. The coupling, described below, attached to the rotor 12 at connection point 18a and aligned with the true center 28 of the rotor described above, converts this rotor driving motion into rotational driving motion substantially about a single axis.

The progressive cavity device of the present invention may also function as a pump. If so, a rotatable driving shaft is coupled to the rotor by the articulated coupling described below. The driving shaft causes the rotor to roll within the cavity, which provides a pumping action as is well known to those skilled in the art.

FIG. 2 shows the general construction of the coupling of the present invention. Specifically, the coupling includes a first stub shaft 30, a second stub shaft 40, an intermediate shaft 50 and two elastomeric helical coupling assemblies 70 according to the present invention.

The elastomeric helical coupling assemblies 70, described in greater detail below, connect the first stub shaft 30 to the intermediate shaft 50 at one end thereof and connect the second stub shaft 40 to the intermediate shaft 50 at the other end of the intermediate shaft 50.

The stub shafts 30, 40, each include a connection portion which allows the stub shafts to be connected to either the rotor 12 or the drill bit drive shaft 16 in the manner described above. A variety of connecting means, including threads on the ends of the stub shaft, splines, or the like could be employed. Additionally, as mentioned above, the stub shafts could be formed integrally with either the rotor shaft 12 or the drill bit drive shaft 16.

The end of the stub shafts opposite the end having the connecting portion is secured to the female portion 73 of the coupling assembly 70. In the illustrated embodiment, the specific structure used is a shaft which extends into a sleeve formed as part of the helical coupling assembly 70. This allows the stub shafts 30, 40, to be secured to the coupling assemblies by means of one or more radially extending pins as shown in the lower part of FIG. 2. In this way, the stub shafts are securely connected to one end of the elastomeric helical coupling assembly and, in effect, function as an integral part of that end of the elastomeric joint assembly. It is also possible to form the stub shaft integrally with an end of the coupling assembly. However, this might complicate manufacture.

The intermediate shaft 50 is similarly connected to the male portion 71 of coupling assembly 70. Again, the intermediate shaft 50 could be made integral with the portion of the coupling assembly to which it is fixed, but this might complicate manufacture.

As detailed below, the couplings each include a male portion 71 and a female portion 73 which are interlocked and joined together by highly restrained helically extending rubber or some other elastomer bonded to both the male portion 71 and the female portion 73. Since the elastomer is compressible, the male and female portions may pivot to a limited degree with respect to an adjacent portion in any direction. Torque transmitted by the coupling tends to cause the male portion 71 to thread into the female portion 73. This causes compression and shear of the elastomer. Since this compression and shear occurs over a large effective area (along the length of the threads of the male and female portions 71,73), the torque and thrust bearing capabilities of the coupling are exceptionally high. In addition, the torque bearing capability of the coupling is further enhanced by the use of tapered male and female portions as discussed in further detail below. Moreover, in the unlikely event of a complete or partial failure of the elastomer under loading, the male and female portions are simply threaded together, and further damage to the pump or motor is avoided. Thus, the coupling is fail safe.

As noted above, the portions located at either end of the coupling assembly are secured to a shaft (either a stub-shaft or the intermediate shaft) and the overall coupling assembly includes a stub shaft, a coupling assembly, an intermediate shaft, another coupling assembly and a second stub shaft. This overall assembly has flexibility somewhat similar to that of a conventional double Hooke's universal joint, except that the direction of pivoting of the coupling portions with respect to one another is not limited as with a double Hooke's joint. Although this gives the coupling of the present invention somewhat greater flexibility, it could present a problem. Because the pivoting of the coupling portions with respect to one another cannot be precisely controlled, the ability to eliminate cyclic variations in output speed can be lost. As noted above, one of the advantages of the double Hooke's joint is that the pivoted axes are arranged such that cyclic velocity variations at each universal joint are canceled, thereby giving a constant output speed. This result will not necessarily be obtained using a rubber coupling such as that disclosed herein, where the pivoting within the coupling can be about any axis.

Although the coupling according to the present invention is not, strictly speaking, a double Hooke's joint, it is nevertheless expected that, as used in the present invention, the output will have a substantially constant velocity for at least two reasons. First, the angle of deflection of the shaft portions used in the present invention is typically less than 5°. As noted above, as the angle of deflection approaches 0°, the velocity variation becomes minimal, or even insignificant. Further, because the two coupling assemblies used are identical, but spaced apart they will tend to operate out of phase such that any minimal velocity variations will be canceled out. If it is critical to avoid any velocity variation whatsoever, the coupling assemblies could be forced to operate out of phase for this purpose. However, this is not believed necessary for downhole drilling or pumping because absolute constant velocity is not required.

The construction of the elastomeric joint assembly 70 of the present invention will now be described in greater detail with reference to FIGS. 2, 2A and 4–6. In these drawings, an elastomer 75 fills the space between and is bonded to the respective portions 71 and 73 of the coupling assembly. In accordance with the present invention, the elastomer fills all the voids between the respective portions 71, 73 and other components such that there are no sliding surfaces within the coupling assembly. In addition, the relatively moving portions are perfectly isolated so that the coupling assembly itself is perfectly isolated from the surrounding environment. Further, because the elastomer is bonded to the annular extensions and because the portions are interlocked, the respective portions are securely connected to one another.

Figure 2A:
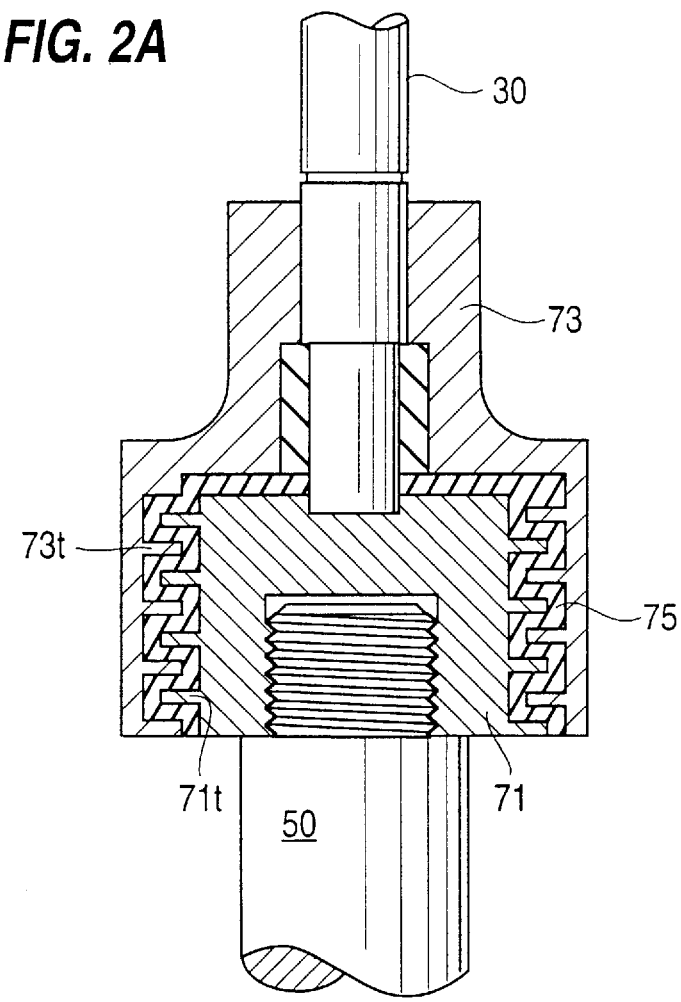
FIG. 2A is a detail view, partially in section, of the elastomeric joint assembly of the present invention used in the coupling of FIG. 2.

As best shown in FIG. 2A, the elastomeric joint assembly 70 includes a male threaded portion 71 and a female threaded portion 73. The male threaded portion 71 is spaced from the female threaded portion 73 so as to define a tortuous helical space there between. The helical space is filled by an elastomer which is bonded to both the male and female threaded portions. Because of the interlocking nature of the male and female threaded portions, the elastomer or rubber 75 is highly restrained. Each of the portions 71 and 73 are formed of a rigid, high strength, material, such as high strength 4140 steel or the like.

Figure 4:
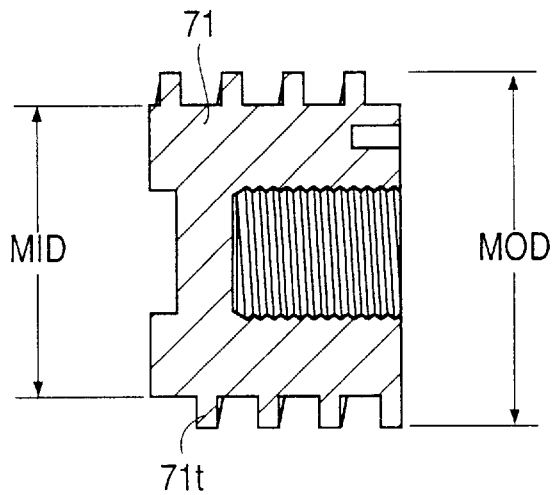
FIG. 4 is a sectional view of the male threaded member of the coupling assembly used in the coupling of FIG. 2.
Figure 5:
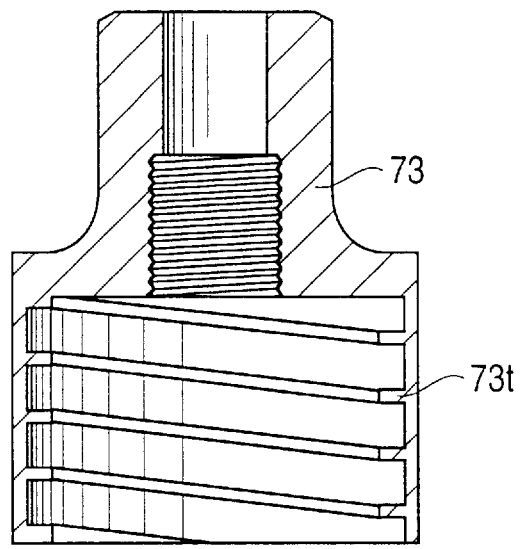
FIG. 5 is a sectional view of one female member of the coupling assembly shown in FIG. 2.
Figure 6:
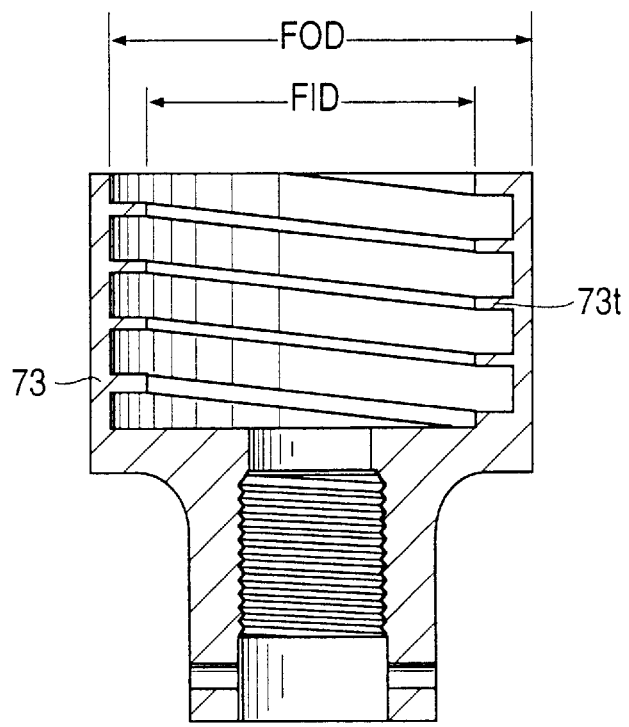
FIG. 6 is a section view of another female member of the coupling assembly used in the coupling shown in FIG. 1.

As best shown in FIG. 2 and detailed in FIGS. 4–6, each helical elastomeric joint assembly 70 includes a male threaded member 71, a female threaded member 73 and an elastomer 75 separating and bonded to both the male threaded member 71 and the female threaded member 73.

The male threaded member 71 is connected to either the intermediate member 50 or the stub shaft 30, 40. The female threaded member 73 is connected to the other of the stub shaft 30, 40 and the intermediate member 50.

The male threaded member 71 is formed with a helical male thread 71t having an inner diameter MID and an outer diameter MOD, as seen in FIG. 4. The female threaded member 73 is formed with a helical female thread 73t having an inner diameter FID and an outer diameter FOD, as seen in FIG. 6. The inner diameter FID of the female helical thread 73t is substantially between the inner diameter MID and the outer diameter MOD of the male thread 71t. In addition, the outer diameter FOD of the female thread 73 exceeds the outer diameter MOD of the male thread 71t. Thus, the male member 71 can be threaded into the female member 73 while a space is provided between male helical thread 71t and the female helical thread 73t. Therefore, the female helical thread 73t and the male helical thread 71t are spaced from one another. Naturally, it is preferable that they male helical thread 71t and the female helical thread 73t have the same thread pitch.

The elastomer 75 is bonded to both the male member 71, including the thread 71t, and the female member 73, including the thread 73t. Because of the interlocking nature of the male and female threads provided by the dimensional relationships between their outer and inner diameters, the elastomer 75 follows a tortuous helical path and is highly restrained. The elastomer 75 gives the couplings sufficient flexibility to accommodate the bending necessary for downhole drilling, for example. On the other hand, any loads passing through the coupling are transmitted longitudinally through the coupling by compression of the elastomer. Since the elastomer is relatively highly restrained in a longitudinal direction, such loads are easily passed through the coupling. Torque loading, on the other hand, results in both compression and shear forces on the elastomer 75 by virtue of the threading of the male member relative to the female member. More specifically, a torsional load on the coupling causes threading of the male helical thread into the female helical thread, compressing the elastomer until the elastomer becomes substantially incompressible so as to allow transmission of torque. Since the elastomer is bonded to both male helical thread 71t and the female helical thread 73t, such movement requires shearing of the elastomer. Because of the helical construction of the elastomer 75, the effective length along which the elastomer is sheared is dramatically increased. This provides the coupling with a dramatically improved torque bearing capability. Moreover, the coupling is fail-safe since even if the elastomeric fails, because the male and female portions will simply thread together.

In a preferred embodiment of the present invention, for example, the outer diameter FOD of the female thread is 3.3 inches and the inner diameter FID of the female thread is 2.7 inches. The outer diameter MOD of the male helical thread 71t is 2.7 inches and the inner diameter MID of the male helical thread 71t is 2.4 inches. Considering the relative nature of these values, it can be easily appreciated how the male helical members are interlocked but yet spaced from one another. Therefore, a tortuous helical path is provided that is filled by the elastomer bonded to the male and female members. This allows transmission of load, but at the same time permitting sufficient bending. Another advantage of the coupling shown is that the surfaces between the male member 71 and the female member 73 are perfectly isolated by the elastomer, such that the coupling is protected from wear and erosion due to the contamination typically found downhole.

In the assembled state as shown in FIG. 2, an annular space remains between each of the interlocked male and female threaded portions, as well as a longitudinal space between the ends of male threaded portions and the adjacent portion of the female threaded member. In accordance with the present invention, the spaces between the portions 71 and 73 of the coupling assembly are filled with an elastomer, such as rubber, which is bonded to the surface of the portions 71 and 73. The elastomer completely fills the spaces. Because these spaces are relatively narrow in the radial direction, the elastomer which fills these spaces is highly restrained. As is known, when an elastomer such as rubber is highly restrained as in the coupling assembly of the present invention, the elastomer becomes virtually incompressible in the longitudinal direction. Thus, the coupling assembly, including the portions 71 and 73 and the elastomer between these portions, is essentially incompressible in the longitudinal direction. However, because the elastomer is not as highly restrained with respect to threading type movement, the coupling is still flexible in shear. Consequently, the portions 71 and 73 have some degree of flexibility with respect to their adjacent portions in all radial directions.

In operation, the flexibility of the portions 71 and 73 of the elastomer coupling assemblies 70 allow a Hooke's joint type motion between the shafts connected by the coupling assembly. Of course, as noted above, there is some additional flexibility because the respective portions 71 and 73 of the coupling assembly can pivot with respect to one another in any direction. The use of two such coupling assemblies and the intermediate shaft 50 between the two stub shafts 30 and 40 makes it possible for the coupling to resolve the complex dynamic motion of the rotor 12 into simple rotation of the drill bit drive shafts 16.

Thus, it can be appreciated that the use of the elastomeric joint assemblies between the respective stub shafts and the intermediate shaft allows a resolution of the complex rotor motion into simple rotation of the drill bit drive shaft in a hermetically sealed environment. This solves the problems experienced in the prior art that employ non-hermetically sealed universal joint assemblies.

Figure 7A:
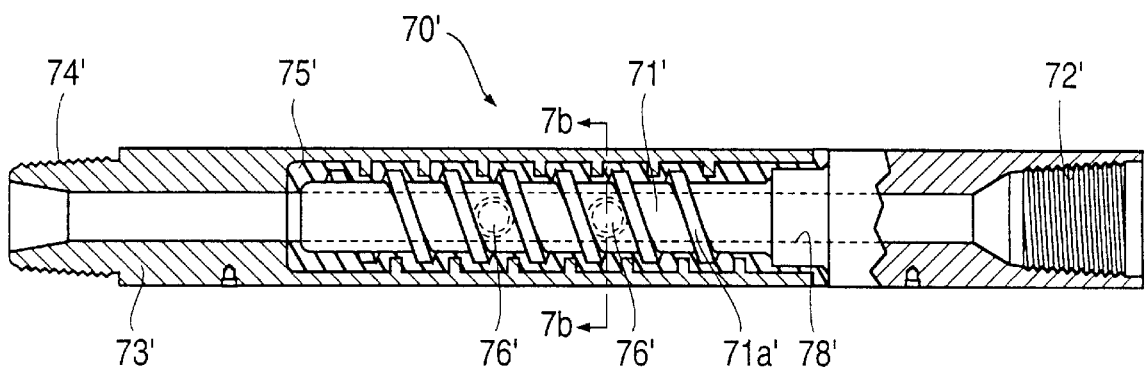
FIG. 7a is a side sectional view of an elastomeric joint assembly having tapered male and female portions, according to another embodiment of the present invention.

FIG. 7a is a side sectional view of another elastomeric joint assembly 70' according to the present invention. Assembly 70' is similar to the aforedescribed assembly 70, and significant repetition of descriptive details is omitted here. Reference numerals used to describe parts of assembly 70' include a prime appended to the corresponding part in assembly 70.

Assembly 70' again includes a male threaded portion 71' and a correspondingly female threaded portion 73'. Male threaded portion has a helical rib portion 71a' constituting a thread. The thread of male threaded portion 71' is spaced from the thread of female threaded portion 73' to define a tortuous helical space therebetween. As before, this helical space is filled by an elastomer 75' that is preferably bonded to both the male and female thread portions.

It is noted here that the male and female threaded portions 71' and 73' are open along their respective axes to permit a flow path therethrough for, for example, the aforedescribed "mud."

As can be seen in FIG. 7a, both the male threaded portion 71' and the female threaded portion 73' are tapered in corresponding fashion along their longitudinal lengths. In particular, the male threaded portion 71' is tapered such that it generally narrows approaching its tip. It has been discovered that providing such tapering further increases the aforementioned ability of the elastomeric joint assembly to bear combined torsional, axial, and lateral (deflection) loads.

In particular, the tapered shape of the male and female threaded portions 71', 73' causes the elastomer 75' to be forced into a narrowing area under operational torque loading. Thus, as torque loads increase, the elastomer 75' is forced into a decreasing space because of the tapering. Since the elastomer 75' is effectively incompressible, torsional stiffness is beneficially increased, and the need for splines or other structures to bear increased torsional loading is obviated. More specifically, by eliminating splines that are, for example, welded into place (as in Vertson, for example), manufacture is advantageously simplified.

In addition, male threaded portion 71' includes an internally threaded box 72', and female threaded portion 73' includes an externally threaded pin 74'.

Figure 8A:
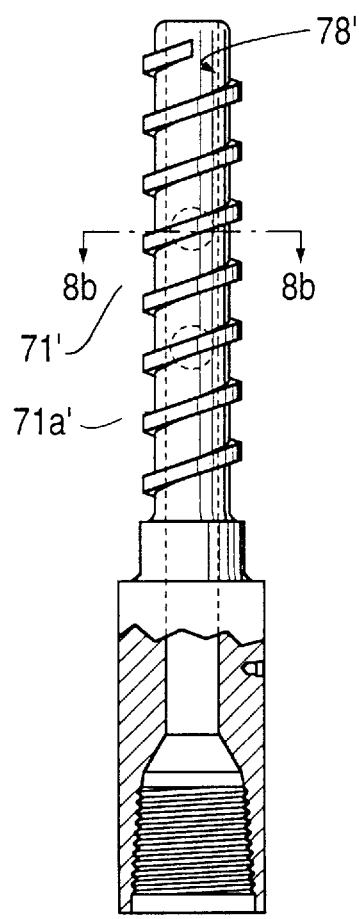
FIG. 8a is a side view, partially cutaway, of the male threaded portion of the elastomeric joint assembly of FIG. 7.
Figure 8B:
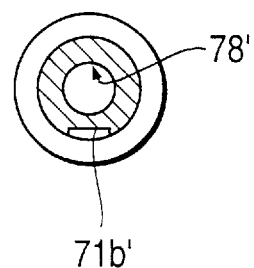
FIG. 8b is a cross-sectional view of the male threaded portion shown in FIG. 8a, taken along A—A.

FIG. 8a shows the male threaded portion 71' alone in side view. Male threaded portion 71' has, as noted above, a bore 78' extending therethrough. FIG. 8b is a cross-sectional view through line A—A in FIG. 8a.

Figure 9A:
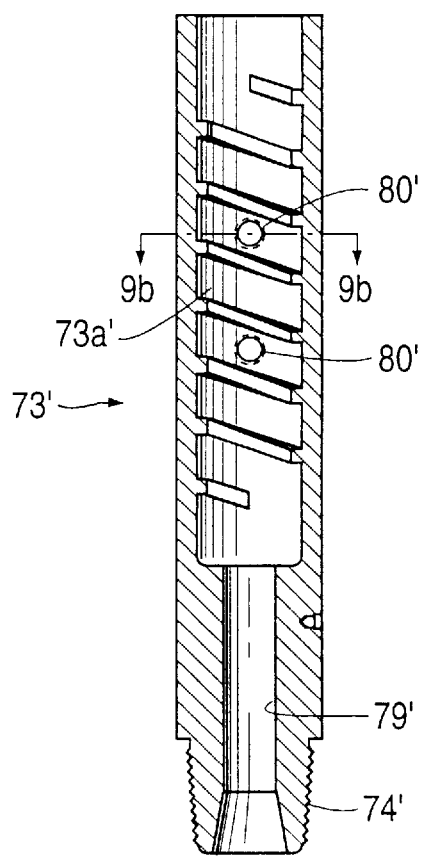
FIG. 9a is a side sectional view of the female threaded portion of the elastomeric joint assembly of FIG. 7.
Figure 9B:
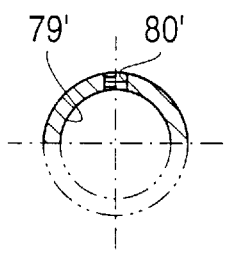
FIG. 9b is a cross-sectional view of the female threaded portion shown in FIG. 8b taken along B—B.

FIG. 9a shows the female threaded portion 73' alone in side sectional view. FIG. 9b is a cross-sectional view through line A—A in FIG. 9a. Female threaded portion 73' has a thread 73a' corresponding to the rib portion 71a' of the male threaded portion 71'. In addition, female threaded portion 73' has an open bore 79' along its axial length, which, when the male and female threaded portions are assembled, is generally aligned with the bore 78' in the male threaded portion.

Figure 10A:
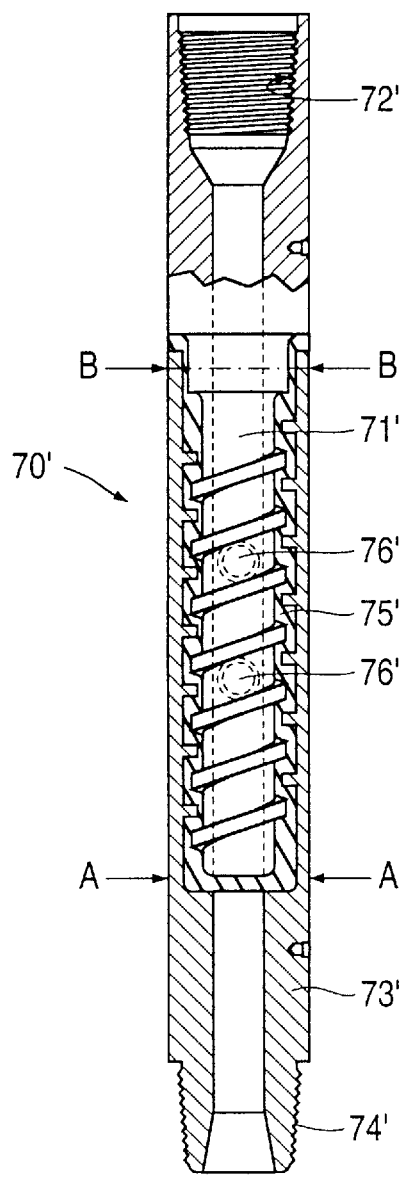
FIG. 10a is a side sectional view of an elastomeric joint assembly illustrating a first example of a fail-safe mechanism against reverse torque.

It will be appreciated, however, that structurally critical (i.e., weak) areas generally exist at the thin-walled section of the female threaded portion 73' that is not supported internally by the male threaded portion 71' (shown at A in FIG. 10a), and at the section of the male threaded portion 71' that is likewise not supported by the female threaded portion 73' (shown at B in FIG. 10a). Tapering the male and female threaded portions according to the instant embodiment of the present invention permits optimization of the strength at these critical sections.

In addition, resistance to bending moments can be enhanced by adjusting (usually decreasing) the radial thickness of the elastomer provided at the critical sections. In this case, the joint becomes "stiffer" and less able to deflect.

It was mentioned above that the elastomeric joint assembly according the present invention is fail-safe. That is, if the elastomer were to fail under a "tightening" torque (i.e. where the male and female threaded portions 71', 73' were tightened relative to one another), the male and female threaded portions simply engage, and the integrity of the coupling is preserved.

The present invention also contemplates preserving coupling integrity under a "loosening" torque, under which influence the male and female threaded portions would be otherwise loosened.

Figure 7B:
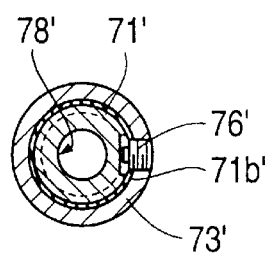
FIG. 7b is a cross-sectional view take from line A—A in FIG. 7.

For example, FIGS. 7a and 7b illustrate the provision of a plurality of locking plugs 76' (two shown here) that are inserted into the assembly after the male and female threaded portions are assembled, but before the elastomer is provided. The plugs 76' substantially prevent the male threaded portion 71' from being unscrewed from (or, more generally, being rotated relative to) the female threaded portion 73'.

Figure 10B:
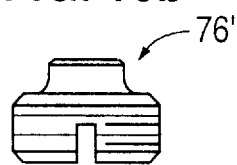
Figure 10C:
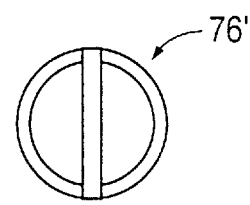

FIG. 7b shows how the locking plugs 76' (illustrated in side and plan view in FIGS. 10b and 10c, respectively) are inserted through respective openings 80' (see FIG. 9b) in a periphery of female threaded portion 73' so as to protrude inwardly therein. In this manner, locking plugs 76' oppose rotation of the male threaded portion 71' because they protrude into a notch-like space 71b' provided in the radially extending rib portion 71a' in male threaded portion 71' (see, for example, FIGS. 7b and 8b).

Another example of a locking mechanism of this type is illustrated in FIG. 11. After the male and female threaded portions 71' and 73' are assembled, a split metal plate 82' is attached (for example, bolted using bolts 84') to the female threaded portion 73'. Thereafter, the elastomer 75' is injected into the space between the male and female threaded portions. The metal plate 82' prevents the loosening, or unscrewing, under reverse torque because it projects radially inwardly. It can be appreciated from FIG. 11, then, that if a loosening torque were applied to the male threaded portion 71' so as to cause it to start to unscrew, axial movement of the male threaded portion 71' relative to female threaded portion 73' would eventually be prevented because the protrusion of the split metal plate 82' would block this movement.

As mentioned above, the elastomeric joint of the present invention can also be used as a suspension structure for isolating a component from its surroundings, particularly to protect the component from shock and high frequency vibration damage.

FIGS. 12a and 12b are side sectional and end views of such a suspension 86, sometimes called an isolator.

Generally, suspension 86 includes an outer sleeve member 88, and an inner sleeve member 90 disposed substantially concentrically therein. Inner and out sleeve members are generally made from a rigid material that can withstand applicable environment conditions, which may include weight, temperature, and corrosion issues. Metallic materials are generally useful for this purpose.

The outer sleeve member 88 has a radially inwardly extending thread 92. The inner sleeve member 90 has radially outwardly extending thread 94. As seen in FIG. 12a, threads 92 and 94 cooperate, whereby the outer and inner sleeve members 88 and 90 are substantially interlocked with respect to an axial direction of the assembly. A "substantially" interlocked arrangement is referred to here because the outer and inner sleeve members 88 and 90 are at least somewhat spaced apart, such that a space remains therebetween. An elastomeric material 95 is deposited in this space.

In general, a component, instrument package, sensor, or the like, is mounted within the inner sleeve member 90. For this purpose, inner sleeve member 90 may be optionally provided with guide slots 96 that guidingly receive corresponding pins or other protrusions on the component being mounted, thereby positively controlling the orientation of the component relative to the inner sleeve member.

In turn, the outer sleeve member 88 (having the inner sleeve member 90 disposed therein) is attached to an external structure, such as, for example, within a well drilling string. Thus, the component is isolated from, for example, high frequency vibration experienced when the well drilling string is used in a drilling operation because the elastomeric material between the inner and outer sleeve members dampens or dissipates this vibration.

In assembling the suspension, the inner sleeve member 90 is typically threaded into position relative outer sleeve member 88.

Figure 13:
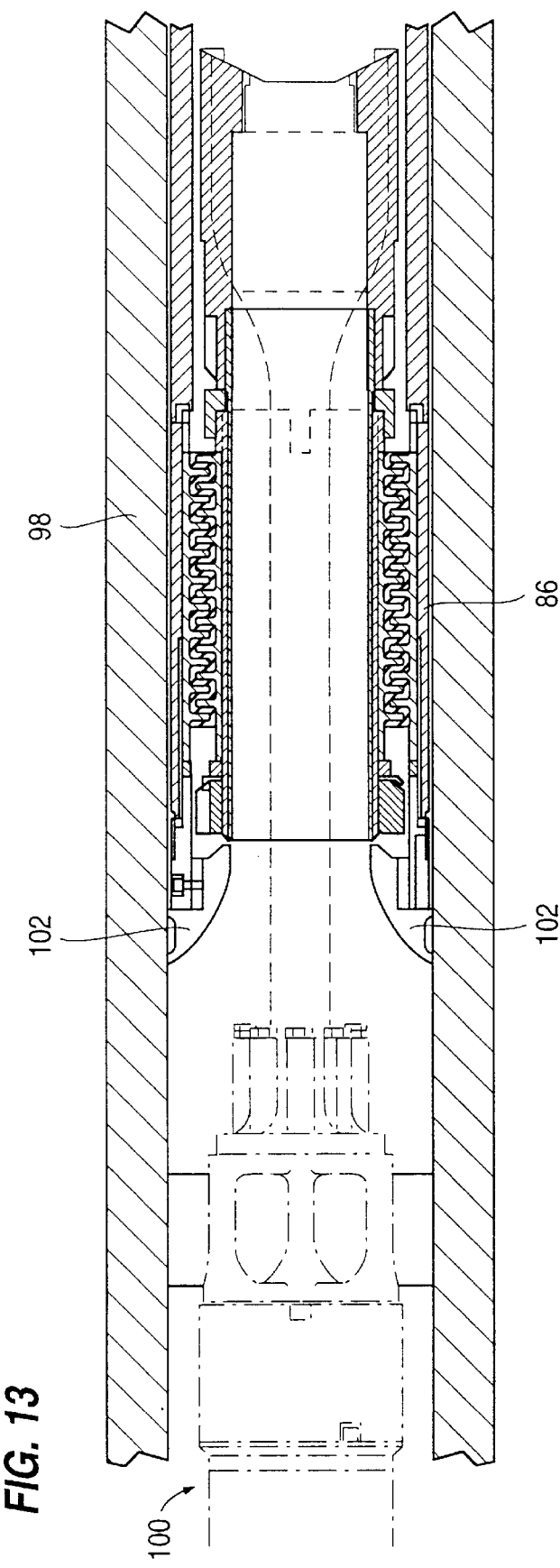
FIG. 13 is a side sectional view of the component suspension of FIG. 12 in situ and showing a component suspension isolated therein in phantom.

FIG. 13 illustrates the suspension 86 in situ within a pipe segment 98, for example, a well drilling string, with an instrument component 100 mounted therein. Suspension 86 may be fixed in place by slidingly inserting it into pipe segment 98 until, for example, it abuts a shoulder 102. Suspension 86 is then locked into place with, for example, bolts, locking keys, locking pins, or the like, in a known manner.

It should be appreciated that the elastomeric joint described herein can also be used in other applications, such as a progressive cavity drive train that is used as a pump. Such devices using the coupling assembly of the present invention can be designed to have an extremely small diameter. Among the many advantages of the present invention are: high torque and thrust bearing capability resulting from the large effective area over which shear occurs; a fail-safe construction whereby the male and female threaded portions thread themselves together under an operational torque load in the absence of elastomer and are prevented from disengaging under a loosening torque load complete isolation of the moving parts to eliminate sliding and consequent wear (resulting in improved durability); and deflection occurs with relatively little force.

What is claimed is:

1. An elastomeric joint comprising:
   a male member having two ends, the male member having an external surface at least a portion of which tapers radially inward toward one end and an external thread formed on the tapered portion of the male member;
   a female member having two ends, the female member having an internal surface, at least a portion of which tapers radially outward toward one end of the female member and an internal thread formed on the tapered portion of the female member, wherein the tapered portion of the male member is threaded into the tapered portion of the female member such that said external and internal threads are interlocked but generally spaced apart that said eternal and internal threads are interlocked but generally spaced apart from each other; and
   an elastomeric material substantially surrounding said male member threaded into said female member, said elastomeric material substantially filling the space between said external and internal threads.

2. An elastomeric joint as claimed in claim 1, wherein said male member includes a box portion having an internal thread formed therein.

3. An elastomeric joint as claimed in claim 1, wherein said female member includes a pin portion at an end thereof opposite said male member threaded therein, said pin portion having an external thread formed thereabout.

4. An elastomeric joint as claimed in claim 1, wherein said elastomeric material is bonded to both said male and female members.

5. An elastomeric joint as claimed in claim 1, further comprising means for preventing said male member from being disengaged from said female member.

6. An elastomeric joint as claimed in claim 5, wherein said means for preventing disengagement comprises a plurality of locking pins mounted on one of said male member and said female member, said plurality of locking pins being positioned so as to prevent said male member from becoming disengaged from said female member.

7. An elastomeric joint as claimed in claim 5, wherein said means for preventing disengagement comprises a locking plate bolted onto said female member.

8. An elastomeric joint adapted for mounting a component independent of a drill string comprising:
   an outer sleeve member having a central axis;
   an inner sleeve member disposed within and substantially concentric with said outer sleeve member, wherein said outer and inner sleeve members are spaced apart; and
   an elastomeric material disposed between said outer and inner sleeve members;
   wherein said outer sleeve member has an interior thread and said inner sleeve has an exterior thread, the inner sleeve member being threaded into the outer sleeve member such that the interior thread and the exterior thread are interlocked but spaced apart from each other by the elastomeric material said interior and exterior threads cooperating so as to threadedly engage said outer and inner sleeve members,
   wherein an interior of said inner sleeve member is constructed and arranged to receive and hold a component independent of the drill string, thereby providing at least one of shock, vibration, electrical and acoustical isolation of the component relative to an exterior environment.

9. An elastomeric joint for connecting two components, the joint comprising:
   an inner member having a first end and a second end and means, provided at the first end of the inner member for connecting the inner member to a first one of the two components to be connected, the inner member further comprising an externally threaded portion having an external thread formed thereon, the external thread extending from the second end of the inner member toward the first end of the inner member and the externally threaded portion being tapered radially outward from the second end of the inner member toward the first end of the inner member,
   an outer member having a first end and a second end and means, provided at the second end of the outer member for connecting the outer member to a second one of the two components to be connected, the outer member further comprising an internally threaded portion having an internal thread formed therein, the internal thread extending from the first end of the outer member toward the second end of the outer member and the internally threaded portion being tapered radially inward from the first end of the outer member toward the second end of the outer member;
   wherein the second end of the inner member is threaded into the first end of the outer member such that said external and internal threads, respectively, are interlocked but generally spaced apart from each other so as to provide a space between the interlocked threads, and
   an elastomeric material substantially filling the space between said external and internal threads.

10. The elastomeric joint of claim 9, wherein the taper of the externally threaded portion is complementary to the taper of the internally threaded portion such that the space between the tapered portions is substantially uniform.

11. The elastomeric joint of claim 9, wherein the means provided at the first end of the inner member comprises a box portion having an internal thread formed therein.

12. The elastomeric joint of claim 9, wherein the means provided at the second end of the outer member comprises a pin portion, said pin portion having an external thread formed thereabout.

13. The elastomeric joint of claim 9, wherein said elastomeric material is bonded to both said inner and outer members.

14. The elastomeric joint of claim 9, further comprising means for preventing said inner member from being disengaged from said outer member.

15. The elastomeric joint of claim 9, wherein said means for preventing disengagement comprises a plurality of locking pins mounted on one of said inner member and said outer member, said plurality of locking pins being positioned so as to prevent the inner member from becoming disengaged from said outer member.

16. The elastomeric joint of claim 9, wherein said means for preventing disengagement comprises a locking plate bolted onto said outer member.

* * * * *